(12) United States Patent
Choe et al.

(10) Patent No.: US 10,074,404 B2
(45) Date of Patent: Sep. 11, 2018

(54) PRESSURE DETECTION OF HERMETICALLY SEALED DEVICE

(71) Applicant: Western Digital Technologies, Inc., Irvine, CA (US)

(72) Inventors: Seong-Hun Choe, Kanagawa (JP); Yuta Onobu, Kanagawa (JP)

(73) Assignee: WESTERN DIGITAL TECHNOLOGIES, INC., Irvine, CA (US)

( * ) Notice: Subject to any disclaimer, the term of this patent is extended or adjusted under 35 U.S.C. 154(b) by 0 days.

(21) Appl. No.: 15/362,332

(22) Filed: Nov. 28, 2016

(65) Prior Publication Data

US 2018/0149536 A1 May 31, 2018

(51) Int. Cl.
*G11B 33/10* (2006.01)
*G01L 9/00* (2006.01)
*G11B 33/14* (2006.01)

(52) U.S. Cl.
CPC ............ *G11B 33/10* (2013.01); *G01L 9/0007* (2013.01); *G11B 33/1466* (2013.01)

(58) Field of Classification Search
None
See application file for complete search history.

(56) References Cited

U.S. PATENT DOCUMENTS

| 6,144,178 | A | 11/2000 | Hirano et al. |
| 6,587,301 | B1 | 7/2003 | Smith |
| 6,603,628 | B1 | 8/2003 | Gillis et al. |
| 6,644,362 | B2 * | 11/2003 | Bernett ................. G11B 33/14 141/61 |
| 6,646,821 | B2 | 11/2003 | Bernett et al. |
| 6,865,950 | B2 * | 3/2005 | Freakes ................. G01L 9/0025 73/702 |
| 7,212,370 | B1 | 5/2007 | Fukushima |
| 7,434,987 | B1 | 10/2008 | Gustafson et al. |
| 7,924,527 | B2 | 4/2011 | Aoyagi et al. |
| 8,094,409 | B2 | 1/2012 | Feliss et al. |
| 8,687,307 | B1 * | 4/2014 | Patton, III ........... G11B 25/043 360/55 |
| 9,202,504 | B2 * | 12/2015 | Akagi ...................... G11B 5/84 |

OTHER PUBLICATIONS

"Advancements in Helium Leak Detection for Disk Drive Manufacturing," Jul. 11, 2011, Agilent Technologies, Inc., https://www.agilent.com/cs/library/technicaloverviews/Public/HDD_TechOverview_JMcLaren_7-8-11%20(2).pdf, accessed Mar. 19, 2018.

* cited by examiner

*Primary Examiner* — William J Klimowicz
(74) *Attorney, Agent, or Firm* — Kunzler, PC

(57) ABSTRACT

A device is disclosed herein. The device comprises a housing, a gas, an antenna, and a control module. The housing defines and hermetically seals an interior cavity. The gas is contained within the interior cavity of the housing at a pressure greater than atmospheric pressure. At least a portion of the antenna is within the interior cavity of the housing. The control module is operably coupled with the antenna to transmit an incident radio wave into the interior cavity of the housing and receive a reflected radio wave within the interior cavity of the housing. The control module is configured to determine a resonance frequency of the interior cavity of the housing based on, at least partially, the reflected radio wave, and determine the pressure of the gas contained within the interior cavity of the housing based on, at least partially, the resonance frequency of the interior cavity of the housing.

16 Claims, 7 Drawing Sheets

PRESSURE DETECTION OF HERMETICALLY SEALED DEVICE

FIELD

This disclosure relates generally to monitoring conditions of electronic devices, and more particularly to detecting the pressure within hermetically sealed devices.

BACKGROUND

Some hermetically sealed devices, such as hard disk drives, are known in the art for the purpose of storing data. Such hermetically sealed devices may contain a gas at a specified pressure. Over time, the pressure of the gas may change as the gas leaks from the hermetically sealed device. Some leaks and associated pressure changes may result in the loss of the data stored on the hermetically sealed device. Accordingly, detecting changes of the pressure of the gas within a hermetically sealed device may help to avoid data loss. However, detecting the pressure of a gas within a hermetically sealed device can be difficult and inefficient.

SUMMARY

A need exists for an apparatus, system, and method for detecting a pressure of a gas contained within a hermetically sealed device that overcomes the shortcomings of prior art techniques. The subject matter of the present application has been developed in response to the present state of hermetically sealed device art, and in particular, in response to problems and needs in the hermetically sealed device art, such as those discussed above, that have not yet been fully solved by prior art techniques. Accordingly, the embodiments of the present disclosure overcome at least some of the shortcomings of the prior art.

A device is disclosed herein. The device comprises a housing, a gas, an antenna, and a control module. The housing defines and hermetically seals an interior cavity. The gas is contained within the interior cavity of the housing at a pressure greater than atmospheric pressure. At least a portion of the antenna is within the interior cavity of the housing. The control module is operably coupled with the antenna to transmit an incident radio wave into the interior cavity of the housing and receive a reflected radio wave within the interior cavity of the housing. The control module is configured to determine a resonance frequency of the interior cavity of the housing based on, at least partially, the reflected radio wave, and determine the pressure of the gas contained within the interior cavity of the housing based on, at least partially, the resonance frequency of the interior cavity of the housing. The preceding subject matter of this paragraph characterizes example 1 of the present disclosure.

The device further comprises a power divider and a directional coupler. The power divider is operable to split an input signal corresponding of one of a plurality of frequencies into a first incident signal and a second incident signal. The directional coupler is electrically coupled with the power divider to receive the second incident signal from the power divider and transmit the second incident signal to the antenna, which generates the incident radio wave in response to the second incident signal. The directional coupler additionally receives a reflected signal, from the antenna, corresponding with the reflected radio wave. The preceding subject matter of this paragraph characterizes example 2 of the present disclosure, wherein example 2 also includes the subject matter according to example 1, above.

The device further comprises a frequency sweeper, selectively operable to generate the input signal and vary a frequency of the input signal to each of the plurality of frequencies. The preceding subject matter of this paragraph characterizes example 3 of the present disclosure, wherein example 3 also includes the subject matter according to example 2, above.

The control module is further configured to monitor a power of the reflected signal for each of the plurality of frequencies and assign the frequency of the reflected signal, when a power of the reflected signal is the strongest, as the resonance frequency of the interior cavity of the housing. The preceding subject matter of this paragraph characterizes example 4 of the present disclosure, wherein example 4 also includes the subject matter according to any one of examples 2 and 3, above.

The device further comprises a first power meter, electrically coupled with the power divider and operable to detect a power of the first incident signal. The device also comprises a second power meter, electrically coupled with the directional coupler to receive the reflected signal and operable to detect the power of the reflected signal, to enable the control module to monitor the power of the reflected signal. The preceding subject matter of this paragraph characterizes example 5 of the present disclosure, wherein example 5 also includes the subject matter according to example 4, above The control module is further configured to determine the pressure of the gas contained within the interior cavity of the housing based further on, at least partially, a comparison between the resonance frequency of the interior cavity of the housing at two different times. The preceding subject matter of this paragraph characterizes example 6 of the present disclosure, wherein example 6 also includes the subject matter according to any one of examples 1 to 5, above.

The resonance frequency of the interior cavity of the housing at an earlier one of the two different times is predetermined. The preceding subject matter of this paragraph characterizes example 7 of the present disclosure, wherein example 7 also includes the subject matter according to example 6, above.

The control module is further configured to detect a change in the pressure of the gas contained within the interior cavity of the housing based on a difference between the resonance frequency of the interior cavity of the housing at the two different times. The control module is also configured to determine the pressure of the gas contained within the interior cavity of the housing based further on, at least partially, the change in the pressure of the gas contained within the interior cavity of the housing. The preceding subject matter of this paragraph characterizes example 8 of the present disclosure, wherein example 8 also includes the subject matter according to any one of examples 6 and 7, above.

The control module is further configured to detect a change in the pressure of the gas contained within the interior cavity of the housing by proportionally relating the difference between the resonance frequency of the interior cavity of the housing at the two different times and the change in the pressure of the gas contained within the interior cavity of the housing. The preceding subject matter of this paragraph characterizes example 9 of the present disclosure, wherein example 9 also includes the subject matter according to example 8, above.

The gas comprises helium gas. The preceding subject matter of this paragraph characterizes example 10 of the present disclosure, wherein example 10 also includes the subject matter according to any one of examples 1 to 9, above.

The device further comprises a magnetic recording medium within the interior cavity of the housing, an arm within the interior cavity of the housing and rotatably movable relative to the magnetic recording medium, and a read-write head coupled to the arm. The preceding subject matter of this paragraph characterizes example 11 of the present disclosure, wherein example 11 also includes the subject matter according to any one of examples 1 to 10, above.

Also disclosed herein is an apparatus comprising a signal module, a resonance frequency module, and a pressure module. The signal module is configured to control generation of a reflected radio wave within an interior cavity of a hermetically sealed device. The resonance frequency module is configured to determine a resonance frequency of the interior cavity of the hermetically sealed device based on, at least partially, the reflected radio wave. The pressure module is configured to determine a pressure of a gas contained within the interior cavity of the hermetically sealed device based on, at least partially, the resonance frequency of the interior cavity of the hermetically sealed device. The preceding subject matter of this paragraph characterizes example 12 of the present disclosure.

The signal module is further configured to control generation of the reflected radio wave within the interior cavity of the hermetically sealed device at a plurality of frequencies. The resonance frequency module is further configured to determine the resonance frequency by assigning the frequency of the reflected radio wave, when a power of the reflected radio wave is the strongest, as the resonance frequency of the interior cavity of the hermetically sealed device. The preceding subject matter of this paragraph characterizes example 13 of the present disclosure, wherein example 13 also includes the subject matter according to example 12, above.

The pressure module is further configured to determine the pressure of the gas contained within the interior cavity of the hermetically sealed device based on, at least partially, a difference, over time, in the resonance frequency of the interior cavity of the hermetically sealed device determined by the resonance frequency module. The preceding subject matter of this paragraph characterizes example 14 of the present disclosure, wherein example 14 also includes the subject matter according to any one of examples 12 and 13, above.

The resonance frequency module is further configured to detect a change in the resonance frequency of the interior cavity of the hermetically sealed device. The pressure module is further configured to detect a change in the pressure of the gas contained within the interior cavity of the hermetically sealed device based on, at least partially, the change in the resonance frequency of the interior cavity of the hermetically sealed device. The pressure module is further configured to determine the pressure of the gas contained within the interior cavity of the hermetically sealed device based on, at least partially, the change in the pressure of the gas contained within the interior cavity of the hermetically sealed device. The change in the pressure of the gas contained within the interior cavity of the hermetically sealed device is proportional with the change in the resonance frequency of the interior cavity of the hermetically sealed device. The preceding subject matter of this paragraph characterizes example 15 of the present disclosure, wherein example 15 also includes the subject matter according to example 14, above.

Additionally disclosed herein is a method of determining a pressure of a gas contained within an interior cavity of a hermetically sealed device. The method comprises transmitting an incident radio wave into the interior cavity of the hermetically sealed device, detecting a reflected radio wave within the interior cavity of the hermetically sealed device, determining a resonance frequency of the interior cavity of the hermetically sealed device based on, at least partially, the reflected radio wave, and determining the pressure of the gas contained within the interior cavity of the hermetically sealed device based on, at least partially, the resonance frequency of the interior cavity of the hermetically sealed device. The preceding subject matter of this paragraph characterizes example 16 of the present disclosure.

Transmitting the incident radio wave into the interior cavity of the hermetically sealed device comprises transmitting the incident radio wave at a plurality of frequencies. Detecting the reflected radio wave within the interior cavity of the hermetically sealed device comprises detecting a power of the reflected radio wave at each of the plurality of frequencies. Determining the resonance frequency of the interior cavity of the hermetically sealed device comprises assigning, as the resonance frequency of the interior cavity of the hermetically sealed device, the frequency of the reflected radio wave corresponding with the highest power of the reflected radio wave. The preceding subject matter of this paragraph characterizes 17 of the present disclosure, wherein example 17 also includes the subject matter according to example 16, above.

The method further comprises detecting a difference, over time, in the resonance frequency of the interior cavity of the hermetically sealed device. Detecting the pressure of the gas contained within the interior cavity of the hermetically sealed device is further based on, at least partially, the difference, over time, in the resonance frequency of the interior cavity of the hermetically sealed device. The preceding subject matter of this paragraph characterizes example 18 of the present disclosure, wherein example 18 also includes the subject matter according to any one of examples 16 and 17, above.

Also disclosed herein is an apparatus that comprises a signal means, a resonance frequency means, and a pressure means. The signal means is for controlling generation of a reflected radio wave within an interior cavity of a hermetically sealed device. The resonance frequency means is for determining a resonance frequency of the interior cavity of the hermetically sealed device based on, at least partially, the reflected radio wave. The pressure means is for determining a pressure of a gas contained within the interior cavity of the hermetically sealed device based on, at least partially, the resonance frequency of the interior cavity of the hermetically sealed device. The preceding subject matter of this paragraph characterizes example 19 of the present disclosure.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the disclosure will be readily understood, a more particular description of the disclosure briefly described above will be rendered by reference to specific embodiments that are illustrated in the appended drawings. Understanding that these drawings depict only typical embodiments of the disclosure and are not therefore to be considered to be limiting of its scope, the subject matter of the present application will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1:
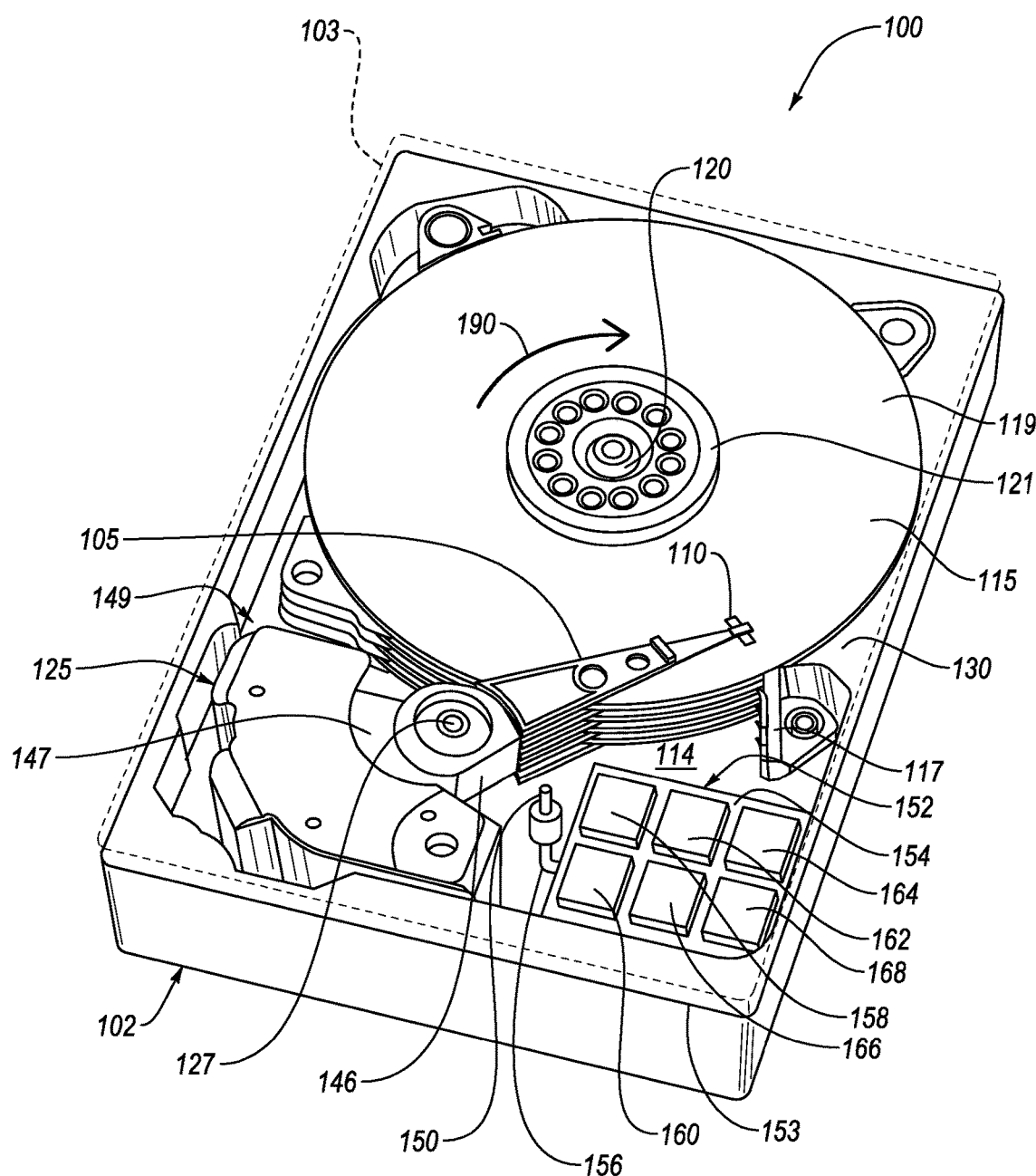
FIG. 1 is a perspective view of a hermetically sealed device, according to one or more embodiments of the present disclosure.
Figure 2:
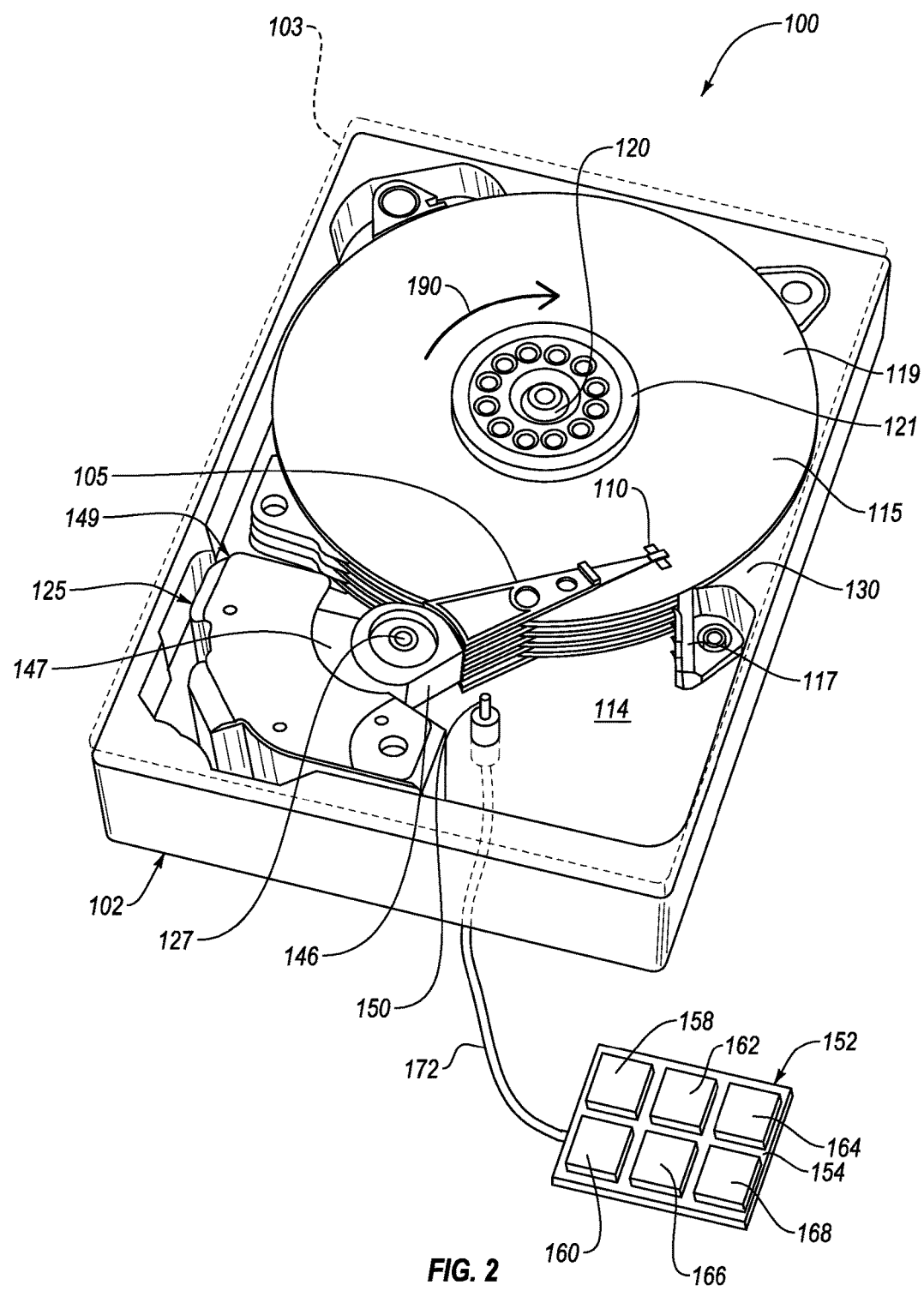
FIG. 2 is a perspective view of another hermetically sealed device, according to one or more embodiments of the present disclosure.

Referring to FIGS. 1 and 2, a hermetically sealed device 100, according to respective embodiments, is depicted as a hard disk drive (HDD). However, in other embodiments, the hermetically sealed device 100 can be another type of magnetic storage device or any of various other electronic devices. The hermetically sealed device 100 includes a housing 102 that hermetically seals or encloses an interior cavity 114 defined within the housing 102. The housing 102 includes a base 130 and a cover 103 (shown in hidden lines in FIG. 1 so as not to obscure internal features of the hermetically sealed device 100 within the interior cavity 114 of the housing 102). The cover 103 is coupled to the base 130 to enclose and hermetically seal the interior cavity 114 from the environment exterior to the housing 102. In some implementations, a seal or gasket is positioned between the base 130 and the cover 103 to promote a hermetic seal between the base 130 and the cover 103.

The hermetically sealed device 100 includes various features located within the interior cavity 114 of the housing 102. In some embodiments, the hermetically sealed device 100 is an HDD that includes arms 105, read-write heads 110, disks 115, a spindle motor 120, and a voice coil magnetic (VCM) actuator 125. Although the hermetically sealed device 100 is shown to have five arms 105, one read-write head 110 per arm, four disks 115, one spindle motor 120, and one VCM actuator 125, any number of arms 105, read-write heads 110, disks 115, spindle motors 120, and VCM actuators 125 may be employed.

The spindle motor 120 is coupled to the base 130. Generally, the spindle motor 120 includes a stationary portion non-movably fixed relative to the base 130 and a spindle that is rotatable relative to the stationary portion and the base 130. Accordingly, the spindle of the spindle motor 120 can be considered to be part of or integral with the spindle motor. Generally, the spindle motor 120 is operable to rotate the spindle relative to the base 130. The disks 115, or platters, are co-rotatably fixed to the spindle of the spindle motor 120 via respective hubs 121, which are co-rotatably secured to respective disks 115 and the spindle. As the spindle of the spindle motor 120 rotates, the disks 115 correspondingly rotate. In this manner, the spindle of the spindle motor 120 defines a rotational axis of each disk 115. The spindle motor 120 can be operatively controlled to rotate the disks 115 a controlled amount at a controlled rate.

Each of the disks 115 may be any of various types of magnetic recording media. Generally, in one embodiment, each disk 115 includes a substrate and a magnetic material applied directly or indirectly onto the substrate. For example, the magnetic material of the disks 115 may be conventional granular magnetic recording disks or wafers that have magnetic layer bits with multiple magnetic grains on each bit. In granular magnetic media, all of the bits are co-planar and the surface of the disk is substantially smooth and continuous. In one embodiment, each bit has a magnetic dipole moment that can either have an in-plane (longitudinal) orientation or an out-of-plane (perpendicular) orientation.

As the disks 115 rotate in a read-write mode, the VCM actuator 125 electromagnetically engages voice coils 147 of respective arms 105 to rotate the arms 105, and the read-write heads 110, which are coupled to the arms 105 as will be explained in more detail below, relative to the disks 115 in a rotational direction along a plane parallel to the read-write surfaces 119 of the disks 115. The arms 105 can be rotated to position the read-write heads 110 over a specified radial area of the read-write surfaces 119 of the disks 115 for read and/or write operations. The VCM actuator 125 is fixed to the base 130 in engagement with the voice coils 147 of the arms 105, which are rotatably coupled to the base 130 via a spindle 127 extending through an actuator body 146. Generally, the spindle 127 defines a rotational axis about which the arms 105 rotate when actuated by the VCM actuator 125.

The arms 105 are non-movably fixed to and extend away from the actuator body 146 in a spaced-apart manner relative to each other. In some implementations, the arms 105 are spaced an equi-distance apart from each other and extend parallel relative to each other. A respective one of the disks 115 is positioned between adjacent arms 105. In an idle mode (e.g., when read-write operations are not being performed), the VCM actuator 125 is actuated to rotate the arm 105, in a radially outward direction relative to the disks 115, such that each head 110 is parked or unloaded onto a ramp support 117 secured to the base 130.

The hermetically sealed device 100 further includes a device control module, including software, firmware, and/or hardware, used to control operation of the various components of the hermetically sealed device 100. The device control module may include a printed circuit board on or in which the hardware is mounted. In embodiments where the hermetically sealed device is an HDD, the device control module can be electrically coupled to the VCM actuator 125 and the read-write head 110 via one or more electrical communication signal transmission lines. The electrical communication signal transmission lines facilitate the transmission of power, commands, and data between the device control module and the VCM actuator 125 and the read-write head 110. In some embodiments, the device control module may form part of a pressure sensing module 152, as will be explained in more detail below, or the pressure sensing module 152 may form part of the device control module.

To promote the efficient and reliable operation of the components within the interior cavity 114 of the hermetically sealed device 100, a gas 149 is introduced into the interior cavity 114 to create a gas-enriched atmosphere within the interior cavity 114. In one implementation, the gas 149 is an inert gas with a density lower than air. For example, the gas 149 can be helium. Furthermore, the interior cavity 114 is maintained at a pressure that is different than that of the exterior atmosphere outside of the housing 102. For example, in one implementation, the interior cavity 114 is maintained at a pressure lower than that of the exterior atmosphere.

The housing 102, being hermetically sealed, is designed to prevent leaks of the gas 149 from the housing 102. However, the hermetical seal of the housing 102 may be damaged or become defective to the point where the gas 149 may leak from the housing 102. Leaks in the housing 102 tend to cause an increase in pressure or introduction of heavier air, which can harm the efficiency, reliability, and functionality of the hermetically sealed device 100, not to mention the potential for losing data stored by the hermetically sealed device. Accordingly, a change in the pressure within the interior cavity 114 would indicate a leak in the housing 102, thus requiring a repair of the housing 102 or a replacement of the housing 102. For this reason, determining the pressure within the interior cavity 114, and more specifically changes in the pressure within the interior cavity 114, is desirable to ensure proper operation of the hermetically sealed device 100 and reduce damage to or data loss from the hermetically sealed device 100.

The hermetically sealed device 100 also includes an antenna 150 coupled to the housing 102 within the interior cavity 114 of the housing 102. The antenna 150 can be any of various components operable to transmit electromagnetic radio waves and receive electromagnetic radio waves. Generally, the antenna 150 is configured to convert a signal, at a given frequency and amplitude, to an electromagnetic radio wave, at a corresponding frequency and amplitude. The antenna 150 is also configured to convert an electromagnetic radio wave, at a given frequency and amplitude, to a signal, at a corresponding frequency and amplitude. As defined herein, a signal is an electric signal that is transmitted over an electrically conductive medium (e.g., wire) and a radio wave is an electromagnetic wave that is transmitted over an electrically non-conductive medium (e.g., gas).

In one embodiment, the antenna 150 includes an arrangement of metallic conductor elements electrically connected to a signal transmission line. Although the hermetically sealed device 100 is shown to include a single antenna 150, in other embodiment, the hermetically sealed device 100 includes multiple antennae 150.

At least a portion of the antenna 150 is located within the interior cavity 114 of the housing 102. Referring to FIG. 1, in one embodiment, an entirety of the antenna 150 is located within the interior cavity 114 of the housing 102 such that no portion of the antenna 150 extends through the housing 102 or is positioned exteriorly of the housing 102. However, referring to FIG. 2, in an embodiment, a portion of the antenna 150 extends through the housing 102 or is positioned exteriorly of the housing 102. For example, the antenna 150 can be fed through the base 130 of the housing 102 such that a portion of the antenna 150 is accessible from outside of the housing 102. In such an embodiment, the antenna 150 can form a seal with the housing 102 such that the interior cavity 114 of the housing 102 remains hermetically sealed.

Referring still to FIGS. 1 and 2, the hermetically sealed device 100 also includes the pressure sensing module 152. Generally, the pressure sensing module 152 is configured to determine a pressure of the gas 149 contained within the interior cavity 114 of the housing 102. More specifically, the pressure sensing module 152 is configured to detect a change in the pressure of the gas 149 contained within the interior cavity 114 by detecting a change in the resonance frequency of the interior cavity 114. As described above, a change in the pressure of the gas 149 might indicate a leak in the housing 102 of the hermetically sealed device 100.

According to one embodiment, the pressure sensing module 152 includes various components, including a power divider 158, a directional coupler 160, a first power meter 162, a second power meter 164, a frequency sweeper 166, and a control module 168. All or some of the components of the pressure sensing module 152 can be mounted on or form part of a printed circuit board 154. Although not shown, the printed circuit board 154 includes circuitry and signal transmission lines that facilitate the transmission of signals between the components of the pressure sensing module 152.

The pressure sensing module 152 is operably coupled with the antenna 150 via a signal transmission line. In some implementations, all or a portion of the pressure sensing module 152 is located within the interior cavity 114 of the housing 102 and operably coupled with the antenna 150 via the internal signal transmission line 156 within the interior cavity 114. For example, as shown in FIG. 1, an entirety of the pressure sensing module 152 is located within the interior cavity 114 of the housing 102. According to yet some implementations, all or a portion of the pressure sensing module 152 is located outside of or external to the interior cavity 114 and operably coupled with the antenna 150 (or portions of the pressure sensing module 152 located within the interior cavity 114) via an external signal transmission line 172 outside of the internal cavity 114. For example, as shown in FIG. 2, an entirety of the pressure sensing module 152 is located outside of the interior cavity 114 of the housing 102. Although not shown, in some implementations some of the components of the pressure sensing module 152 (e.g., the power divider 158, the directional coupler 160, the first power meter 162, and the second power meter 164) can be located within the interior cavity 114, and some of the components of the pressure sensing module 152 (e.g., the frequency sweeper 166 and the control module 168) can be located outside of the interior cavity 114. Components of the pressure sensing module 152 outside of the interior cavity 114 may communicate with components of the pressure sensing module 152 within the interior cavity 114 via any of the various signal transmission lines described herein or other means of communicating signals. The components of the pressure sensing module 152 outside of the interior cavity 114 can form part of a larger computing system (e.g., a server, a desktop computer, and the like) of which the hermetically sealed device 100 forms a part. The internal transmission line 156 and/or the external transmission line 172 can be any of various components for transmitting electronic signals, such as wires, printed circuits, connectors, pins, and the like.

The individual components of the pressure sensing module 152 can be manifested as software, firmware, and/or hardware. In certain implementations, the individual components of the pressure sensing module 152 are formed as discrete semiconductor elements or integrated circuits mounted on a printed circuit board.

Figure 3:
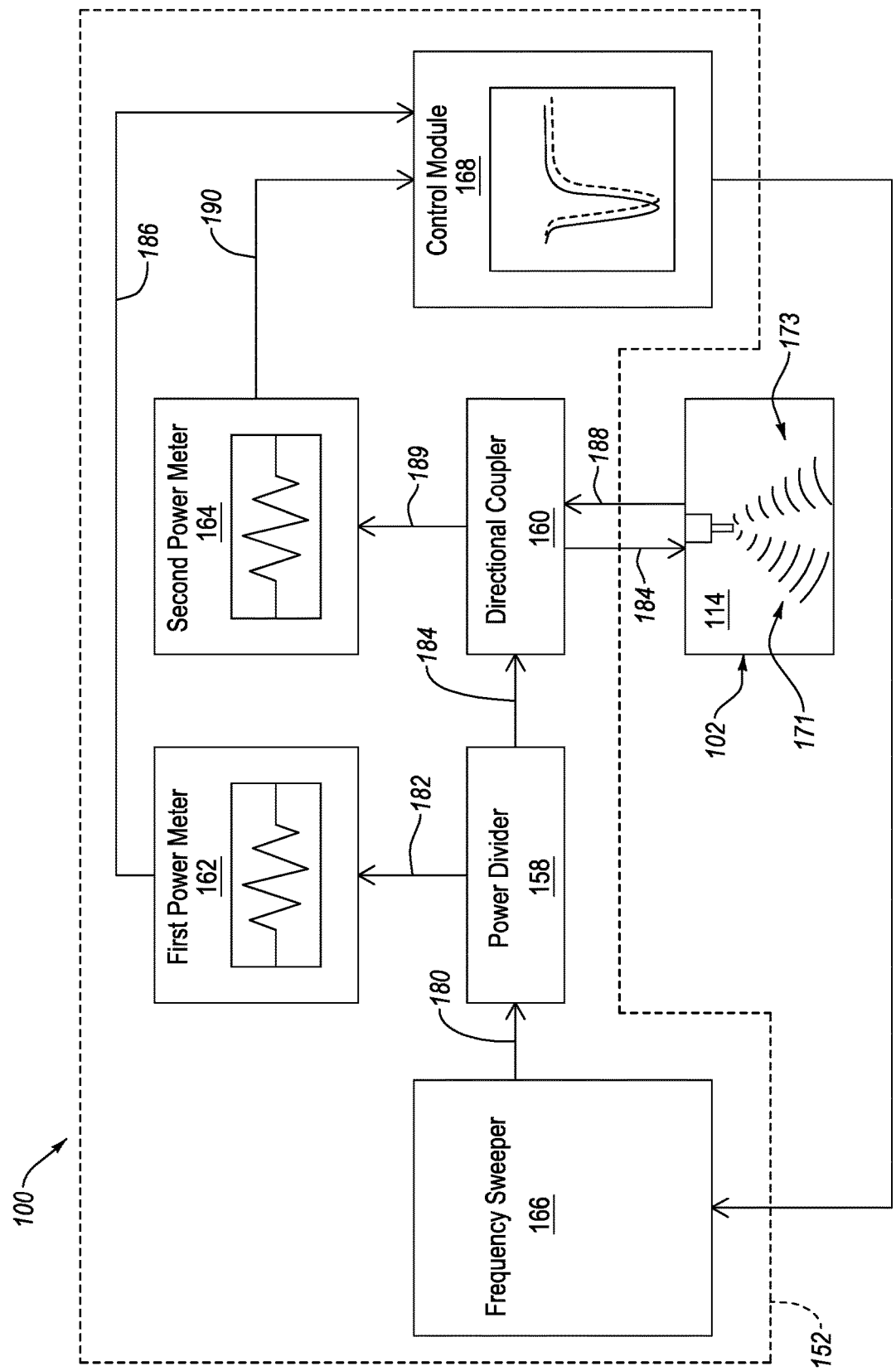
FIG. 3 is a schematic block diagram of a hermetically sealed device, according to one or more embodiments of the present disclosure.
Figure 4:
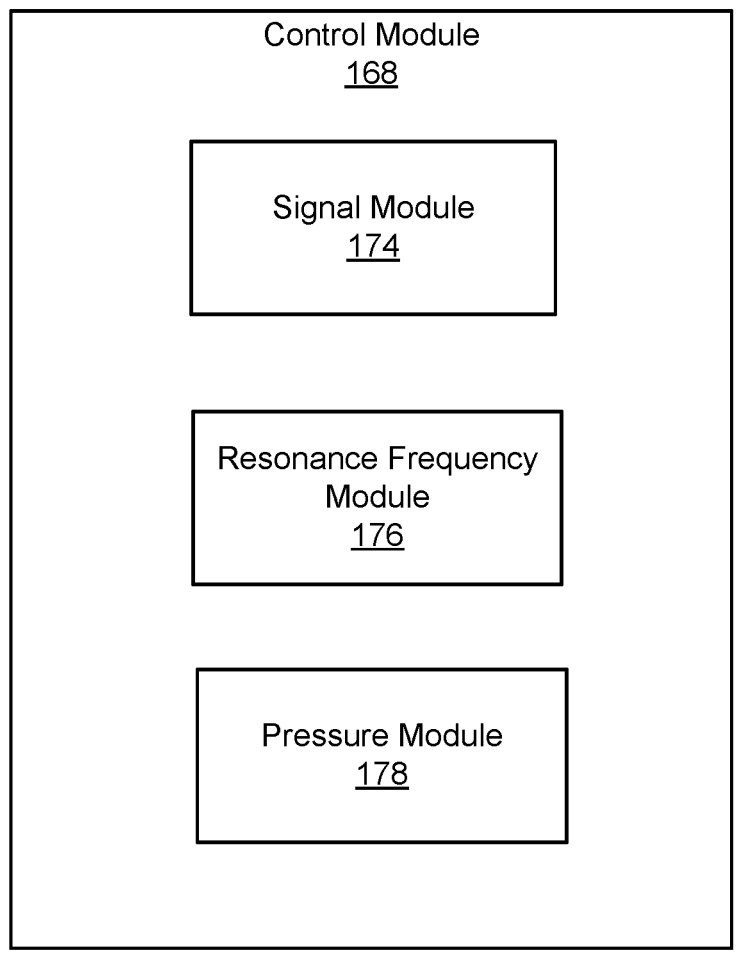
FIG. 4 is a schematic block diagram of a control module of a hermetically sealed device, according to one or more embodiments of the present disclosure.

The frequency sweeper 166 is selectively operable to generate an input signal 180 (see, e.g., FIG. 3) and vary a frequency of the input signal 180 to each of a plurality of frequencies. The bandwidth of the plurality of frequencies, or the range of frequencies generated by the frequency sweeper 166, is selected to ensure that a reflected signal within the interior cavity 114 achieves a resonance frequency of the interior cavity 114 of the housing 102. Accordingly, in one implementation, the frequency sweeper 166 generates the input signal 180 and varies the frequency of the input signal 180 from a low frequency corresponding with a frequency less than a lowest possible resonance frequency of the interior cavity 114 and to a high frequency corresponding with a frequency more than a highest possible resonance frequency of the interior cavity 114. The lowest and highest possible resonance frequencies of the interior cavity 114 are dependent on the pressure of the gas 149 within the interior cavity 114. Because the pressure of the gas 149 within the interior cavity may change, or may be unknown, the lowest and highest possible resonance frequencies of the interior cavity 114 are based on a predicted range of possible pressures of the gas 149, which depends on or includes an optimal working pressure of the interior cavity 114. In some implementations, the optimal working pressure of the interior cavity 114 is between about 50 kPa and about 70 kPa. The number of frequencies generated by the frequency sweeper 166, between the low and high frequencies, can be any number of frequencies, but is sufficiently high to provide a good approximation of the resonance frequency of the interior cavity 114, as will be described in more detail below.

Figure 7:
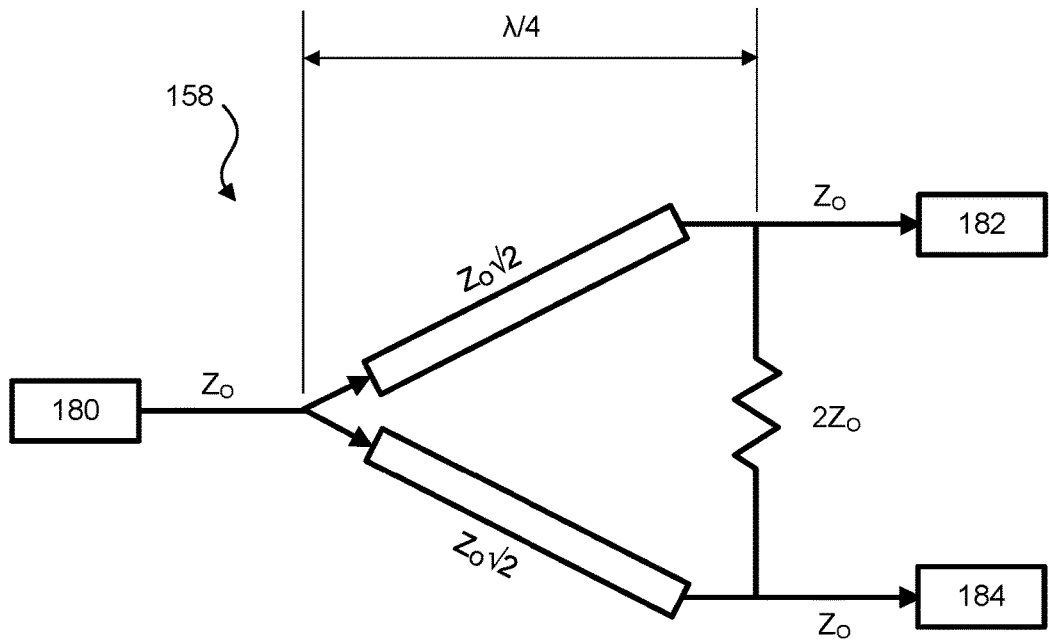
FIG. 7 is a schematic block diagram of a power divider, according to one or more embodiments of the present disclosure.

The power divider 158 is electrically coupled with the frequency sweeper 166 to receive the input signal 180 from the frequency sweeper 166. Moreover, the power divider 158 is operable to split the input signal 180, from the frequency sweeper 166, into a first incident signal 182 and a second incident signal 184 (see, e.g., FIGS. 3 and 7). In some implementations, the power divider 158 is configured to equally split the power of the input signal 180 such that the power of the first incident signal 182 is the same as the power of the second incident signal 184. The power divider 158 does not affect the frequency of the input signal 180 such that the frequency of the first incident signal 182 is the same as the frequency of the second incident signal 184. The power divider 158 can include any of various electrical circuitry that splits the input signal 180 into two separate electrical signals. For example, according to one embodiment, the power divider 158 includes the electrical circuitry shown in FIG. 7. The electrical circuitry includes a transmission line that transmits the input signal 180 and has an impedance $Z_O$. In one implementation, the impedance $Z_O$ is about 50 Ohm. The transmission line transmitting the input signal 180 is divided into two transmission lines each having a first portion with an impedance equal to $Z_O\sqrt{2}$ and a second portion with an impedance equal to $Z_O$. An additional resistance equal to $2Z_O$ is connected between the first portion and second portion of the two transmission lines.

The first power meter 162 is electrically coupled with the power divider 158 to receive the first incident signal 182. Moreover, the first power meter 162 is operable to detect a first power or amplitude of the first incident signal 182. The first power meter 162 is also configured to communicate the first power, via a first power signal 186 (see, e.g., FIG. 3), to the control module 168. In some implementations, the first power meter 162 can be any of various electrical power meters configured to detect the power or amplitude of an electrical signal.

The directional coupler 160 is electrically coupled with the power divider 158 to receive the second incident signal 184 from the power divider 158. Furthermore, the directional coupler 160 is configured to transmit the second incident signal 184 to the antenna 150 within the interior cavity 114 of the housing 102.

In response to receiving the second incident signal 184 from the directional coupler 160, the antenna 150 generates an incident radio wave 171 and transmits the incident radio wave 171 into the interior cavity 114 of the housing 102. The incident radio wave 171 is an electromagnetic wave with an amplitude and frequency corresponding with the second incident signal 184. For example, in one implementation, the frequency of the incident radio wave 171 is substantially equal to the frequency of the second incident signal 184 and the amplitude of the incident radio wave 171 is proportional to the amplitude of the second incident signal 184. The incident radio wave 171 passes through the interior cavity 114 of the housing 102 and ultimately reflects off of a reflective surface of the interior cavity 114 to create a reflected radio wave 173 within the interior cavity 114. The reflected radio wave 173 has an amplitude and a frequency. The reflected radio wave 173 passes through the interior cavity 114 of the housing 102 and is received by the antenna 150. In response to receiving the reflected radio wave 173, the antenna 150 generates a reflected signal 188 (see, e.g., FIG. 3) with a frequency and amplitude corresponding with the reflected radio wave 173. For example, the reflected signal 188 has the same frequency as that of the reflected radio wave 173 and an amplitude proportional to the amplitude of the reflected radio wave 173.

Figure 8:
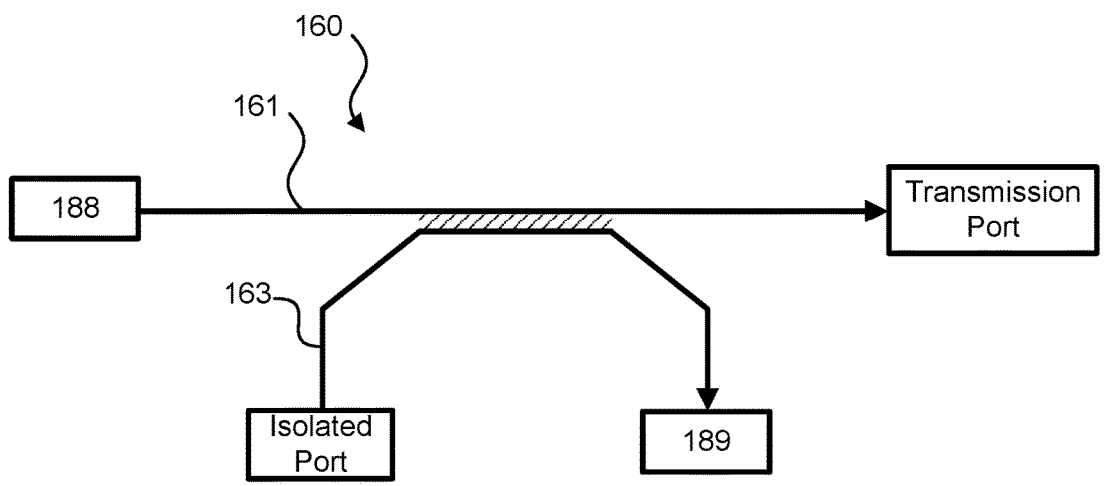
FIG. 8 is a schematic block diagram of a directional coupler, according to one or more embodiments of the present disclosure.

The directional coupler 160 also receives the reflected signal 188 from the antenna 150 and communicates the reflected signal 188 to the second power meter 164, which is electrically coupled with the directional coupler 160. The directional coupler 160 can include any of various electrical circuitry that separates electrical signals transmitted on the same transmission line, but in different directions. For example, according to one embodiment, the directional coupler 160 includes the electrical circuitry shown in FIG. 8. The electrical circuitry includes a first transmission line 161 that transmits the reflected signal 188 to a transmission port. Additionally, the electrical circuitry of the directional coupler 160 includes a second transmission line 163 that is electrically coupled and parallel with the first transmission line 161. The second transmission line 163 extends from an isolated port and transmits a proportional fraction 189 of the reflected signal 188. In other words, a first fraction of the reflected signal 188 passes through the first transmission line 161 and a second fraction of the reflected signal 188 passes through the second transmission line 163. According to one implementation, the first fraction of the reflected signal 188 is much larger than the second fraction of the reflected signal 188. Because the proportional fraction 189 of the reflected signal 188 has directional characteristics, no portion of the reflected signal 188 passes through the isolated port.

The second power meter 164 is operable to detect a second power or amplitude of the reflected signal 188 (e.g., the proportional fraction 189 of the reflected signal 188). In other words, the reflected signal received by the second power meter 164 can be the entirety of the reflected signal 188 or a proportional fraction 189 of the reflected signal 188. The second power meter 164 is also configured to communicate the second power, via a second power signal 190 (see, e.g., FIG. 3), to the control module 168. In some implementations, the second power meter 164 can be any of various electrical power meters configured to detect the power or amplitude of an electrical signal. In some implementations, as shown, the first power meter 162 and the second power meter 164 are physically separate and independent components. However, in other implementations, the first power meter 162 and the second power meter 164 form part of the same component, such as single power meter with multiple channels (e.g., inputs/outputs).

The control module 168 of the pressure sensing module 152 is configured to determine a resonance frequency of the interior cavity 114 of the housing 102 and to determine a pressure of the gas 149 contained within the interior cavity 114 of the housing 102. The control module 168 determines the resonance frequency of the interior cavity 114 based on, at least partially, the reflected radio wave 173. Moreover, the control module 168 determines the pressure of the gas 149 contained within the interior cavity 114 based on, at least partially, the resonance frequency of the interior cavity 114.

According to one embodiment, the control module 168 includes a signal module 174, a resonance frequency module 176, and a pressure module 178. The signal module 174 is configured to control generation of the reflected radio wave 173 within the interior cavity 114 of the housing 102 of the hermetically sealed device 100. More specifically, the signal module 174 is electrically coupled with the frequency sweeper 166 to control operation of the frequency sweeper 166. Accordingly, the signal module 174 controls generation of the reflected radio wave 173 by controlling generation of the input signal 180 by the frequency sweeper 166. For example, the signal module 174 sends a control signal 192 to the frequency sweeper 166 that commands the frequency sweeper 166 to generate the input signal 180 according to commanded characteristics. The commanded characteristics may include the amplitude of the input signal 180 and the frequency characteristics of the input signal 180. In one implementation, the frequency characteristics of the input signal 180 include the frequencies (e.g., range and quantity of frequencies) at which to vary the input signal 180, as well as the overall duration of the input signal 180 and duration of the input signal 180 at each frequency. Because generation of the input signal 180 results in the generation of the incident radio wave 171 and thus the reflected radio wave 173, the signal module 174 controls generation of the reflected radio wave 173 by controlling the frequency sweeper 166.

Figure 5:
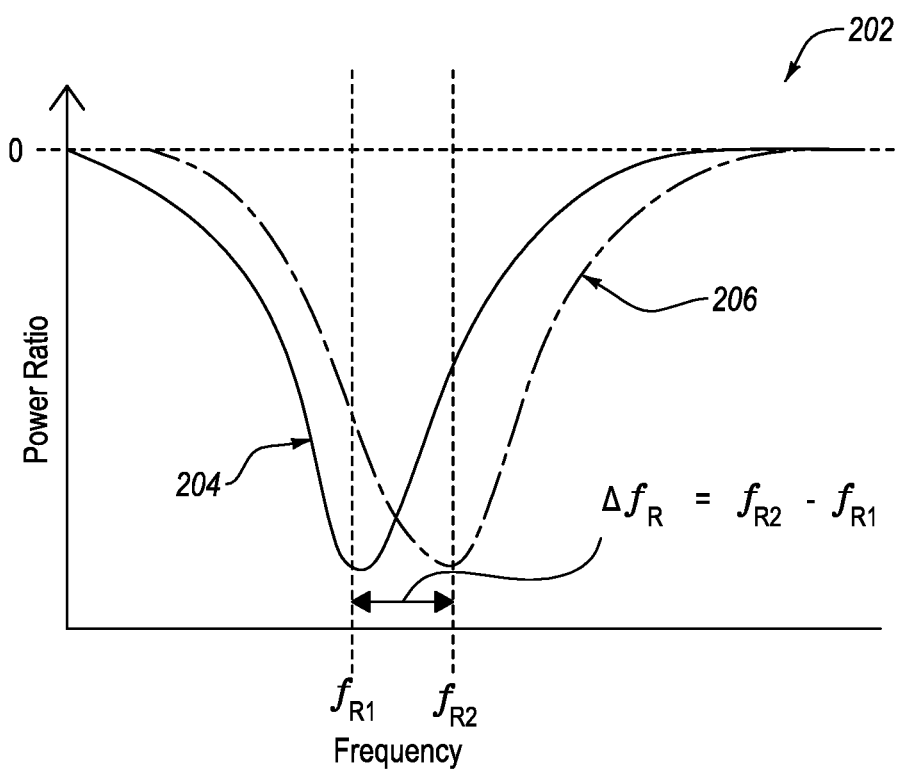
FIG. 5 is a chart comparing power to frequency of a reflected radio wave within an interior cavity of a hermetically sealed device, according to one or more embodiments of the present disclosure.

The resonance frequency module 176 of the control module 168 is configured to determine a resonance frequency of the interior cavity 114 of the hermetically sealed device 100 based on, at least partially, the reflected radio wave 173. Referring to chart 202 of FIG. 5, the resonance frequency module 176 monitors the second power of the reflected signal 188 for each of the plurality of frequencies of the input signal 180 generated by the frequency sweeper 166. The second power of the reflected signal 188 is represented as a power ratio of the second power of the reflected signal 188 to the first power of the first incident signal 182, which can be expressed in units of Ohms. Generally, the resonance frequency of the interior cavity 114 is equal to the frequency of the input signal 180 corresponding with the strongest, absolute, second power of the reflected signal 188 relative to the first power of the first incident signal 182. Accordingly, as shown in FIG. 5, with reference to a first plot 204 associated with an input signal 180 and a reflected signal 188 generated during a first time period, the reflected signal 188 is strongest at a particular frequency, which the resonance frequency module 176 assigns or sets as the resonance frequency of the interior cavity 114 at the first time period or first resonance frequency $f_{R1}$. Similarly, with reference to a second plot 206 associated with an input signal 180 and a reflected signal 188 generated during a second time period, the reflected signal 188 is strongest at a particular frequency, which the resonance frequency module 176 assigns or sets as the resonance frequency of the interior cavity 114 at the second time period or second resonance frequency $f_{R2}$. The first time period is earlier than the second time period.

In some implementations, the first resonance frequency $f_{R1}$ at the first time period is predetermined, preset, or known in advance of operation of the hermetically sealed device 100 by an end-user. The first time period can be associated with the completion of production or manufacturing of the hermetically sealed device 100 and prior to initial use of the hermetically sealed device 100 or shipment of the hermetically sealed device 100 to an end-user. For example, after introducing the gas 149 into the interior cavity 114, adjusting the pressure of the gas 149 within the interior cavity 114, and sealing the hermetically sealed device 100, the first resonance frequency $f_{R1}$ is set as a baseline or starting resonance frequency of the interior cavity 114. Additionally, in some implementations, prior to operation or use of the hermetically sealed device 100 by an end-user, such as before the hermetically sealed device 100 is shipped to an end-user, the baseline resonance frequency of the interior cavity 114 can be confirmed in a factory setting or laboratory setting using various non-consumer testing tools and techniques.

The pressure module 178 is configured to determine the pressure of the gas 149 contained within the interior cavity 114 of the hermetically sealed device 100 based on, at least partially, the resonance frequency of the interior cavity 114 of the hermetically sealed device 100. The resonance frequency of the interior cavity 114 corresponds with the pressure of the gas 149 contained within the interior cavity 114. In other words, under certain conditions, the resonance frequency depends on the pressure of the gas 149. For example, the resonance frequency of the interior cavity 114 may increase in response to an increase in the pressure of the gas 149 and vice versa. The change in the resonance frequency of the interior cavity 114 can be proportional to the change in the pressure of the gas 149 contained within the interior cavity 114. Accordingly, detecting a change in the resonance frequency of the interior cavity 114 may indicate a change in the pressure of the gas 149 and thus a leak in the housing 102 of the hermetically sealed device 100.

According to one embodiment, the pressure module 178 determines the pressure of the gas 149 contained within the interior cavity 114 of the hermetically sealed device 100 based on, at least partially, a difference, over time, in the resonance frequency of the interior cavity 114 of the hermetically sealed device 100 determined by the resonance frequency module 176. For example, in one implementation, the resonance frequency module 176 accesses the data from the chart 202 to determine whether the second resonance frequency $f_{R2}$, at the second time period, is different than the first resonance frequency $f_{R1}$, at the first time period. If the second resonance frequency $f_{R2}$ is different than the first resonance frequency $f_{R1}$, then the resonance frequency module 176 determines the resonance frequency difference ($\Delta f_R$) between the second resonance frequency $f_{R2}$ and the first resonance frequency $f_{R1}$. The pressure module 178 initially detects a change in the pressure of the gas 149 based on the difference between the second resonance frequency $f_{R2}$ and the first resonance frequency $f_{R1}$. As mentioned above, in some implementations, the change in the pressure of the gas 149 can be proportional to the resonance frequency difference $\Delta f_R$. The constant or coefficient of proportionality can be predetermined based on experimental data. Therefore, after the resonance frequency module 176 detects the resonance frequency difference $\Delta f_R$, the pressure module 178 applies the coefficient of proportionality to the resonance frequency difference $\Delta f_R$ to detect the change in the pressure of the gas 149 contained within the interior cavity 114.

Although the chart 202 of FIG. 5 shows just two plots of data for determining two resonance frequencies of the interior cavity 114 at two points of time, in some embodiments, the chart 202 may include more than two plots each providing data for determining each of more than two resonance frequencies at more than two points of time. In some implementations, the control module 168 may determine the resonance frequency of the interior cavity 114 periodically or according to a set pattern during operation of the hermetically sealed device 100. For example, the control module 168 can be configured to determine the resonance frequency of the interior cavity 114 every preset time period (e.g., once/second). The change in resonance frequency can then be determined based on an overall change in the resonance frequency over multiple time periods or the change in the resonance frequency from one time period to the next.

In some implementations, the control module 168 determines that a leak in the housing 102 has occurred when the change in the pressure of the gas 149 reaches a predetermined threshold (or the resonance frequency difference $\Delta f_R$ reaches a predetermined threshold). The control module 168 may include several thresholds each associated with a leak severity or condition of the housing 102. For example, in one implementation, minor changes in the pressure of the gas 149 (or the resonance frequency) may not reach a low threshold, such that only nominal leaking of the housing 102 is indicated. When the change in the pressure of the gas 149 (or the resonance frequency difference $\Delta f_R$) reaches the low threshold, but not a high threshold, moderate leaking is indicated, which may only partially interfere with operation of the hermetically sealed device 100 (e.g., data loss may occur soon) such that continued limited use of the hermetically sealed device 100 is permitted. Then, if the change in the pressure of the gas 149 (or the resonance frequency difference $\Delta f_R$) achieves the high threshold, severe leaking is indicated, which may significantly interfere with operation of the hermetically sealed device 100 (e.g., data loss is imminent) such that repair or replacement of hermetically sealed device 100 is required. Although two thresholds are described above, in some implementations, more or less than two thresholds can be used.

According to certain implementations, the pressure module 178 is configured to determine the pressure of the gas 149 by comparing the change in the pressure of the gas 149 with an earlier, initial, or baseline pressure, which can be determined by the pressure module 178 or preset prior to use of the hermetically sealed device 100. For example, the change in the pressure of the gas 149 can be added to a pressure of the gas 149, previously determined by the pressure module 178, to determine a current pressure of the gas 149. Additionally or alternatively, in some implementations, prior to operation or use of the hermetically sealed device 100 by an end-user, such as before the hermetically sealed device 100 is shipped to an end-user, the change in the pressure of the gas 149 can be added to a baseline pressure of the interior cavity 114, determined or confirmed in a factory setting or laboratory setting using various non-consumer testing tools and techniques. In certain implementations, determining a change in the pressure of the gas 149 contained within the interior cavity 114 can be defined to encompass determining a pressure of the gas 149.

Figure 6:
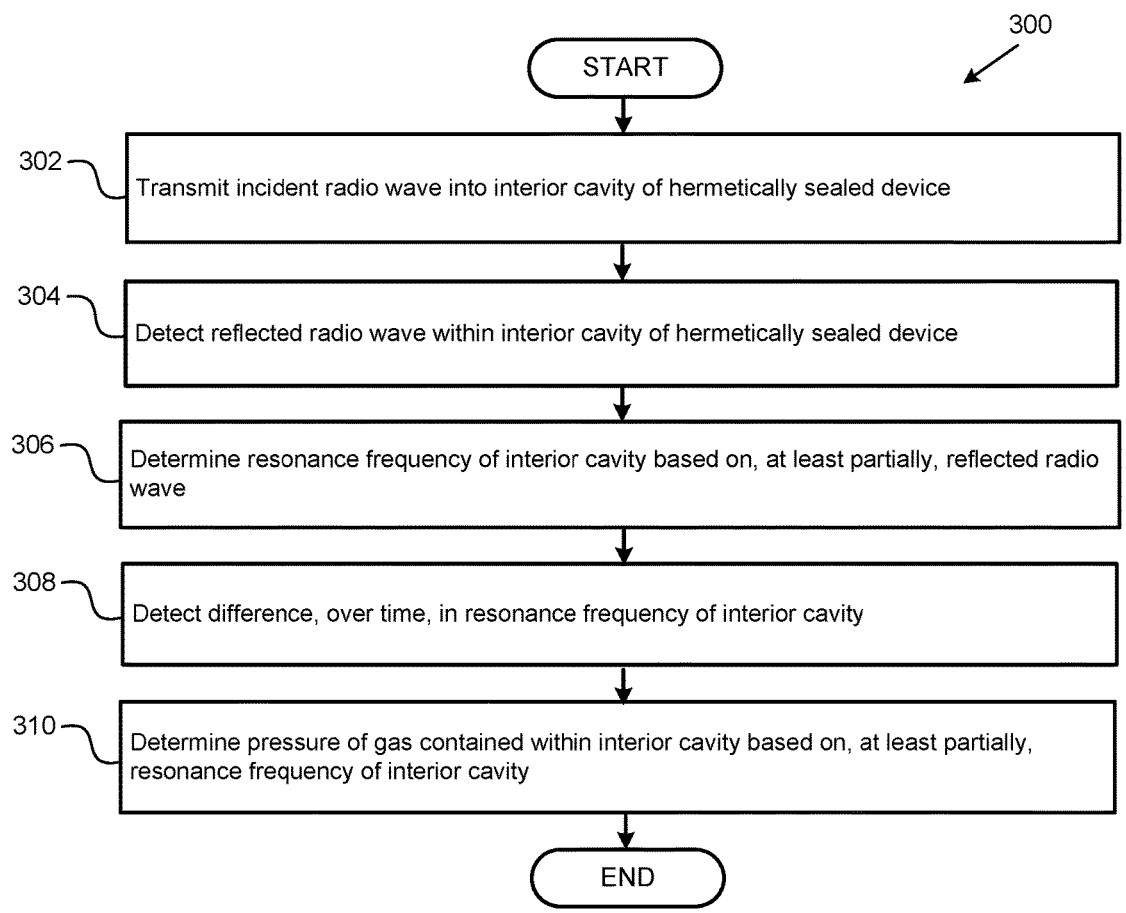
FIG. 6 is a schematic flow chart of a method of determining a pressure of a gas contained within an interior cavity of a hermetically sealed device, according to one or more embodiments of the present disclosure.

Referring to FIG. 6, according to one embodiment, a method 300 of determining a pressure of a gas contained within an interior cavity of a hermetically sealed device is disclosed. The method 300 includes, at block 302, transmitting an incident radio wave into the interior cavity of a hermetically sealed device. The method 300 also includes, at block 304, detecting a reflected radio wave within the interior cavity of the hermetically sealed device. Additionally, the method 300 includes, at block 306, determining the resonance frequency of the interior cavity base on, at least partially, the reflected radio wave. Furthermore, the method 300 includes, at block 308, detecting a difference, over time, in the resonance frequency of the interior cavity. In some implementations, the method 300 continuously monitors the resonance frequency of the interior cavity until there is a difference between at least two resonance frequencies or until a difference between at least two resonance frequencies reaches a threshold. Then, the method 300 includes, at block 310, determining the pressure of gas contained within the interior cavity based on, at least partially, the resonance frequency of the interior cavity. In some implementations, determining the pressure of gas contained within the interior cavity at block 310 is based on, at least partially, the difference, over time, in the resonance frequency of the interior cavity.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

As will be appreciated by one skilled in the art, aspects of the embodiments may be embodied as a system, method or apparatus (e.g., program product). Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

As mentioned above, aspects of the embodiments are described above with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

The description of elements in each figure may refer to elements of proceeding figures. Like numbers refer to like elements in all figures, including alternate embodiments of like elements.

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. A device, comprising:
   a housing, defining and hermetically sealing an interior cavity;
   a gas, contained within the interior cavity of the housing;
   an antenna, wherein at least a portion of the antenna is within the interior cavity of the housing; and
   a control module, operably coupled with the antenna to transmit an incident radio wave into the interior cavity of the housing and receive a reflected radio wave within the interior cavity of the housing, wherein the control module is configured to:
      determine a resonance frequency of the interior cavity of the housing based on, at least partially, the reflected radio wave; and
      determine the pressure of the gas contained within the interior cavity of the housing based on, at least partially, the resonance frequency of the interior cavity of the housing.

2. The device according to claim 1, further comprising:
   a power divider, operable to split an input signal corresponding of one of a plurality of frequencies into a first incident signal and a second incident signal; and
   a directional coupler, electrically coupled with the power divider to receive the second incident signal from the power divider and transmit the second incident signal to the antenna, which generates the incident radio wave in response to the second incident signal, wherein the directional coupler receives a reflected signal, from the antenna, corresponding with the reflected radio wave.

3. The device according to claim 2, further comprising a frequency sweeper, selectively operable to generate the input signal and vary a frequency of the input signal to each of the plurality of frequencies.

4. The device according to claim 2, wherein the control module is further configured to:
   monitor a power of the reflected signal for each of the plurality of frequencies; and
   assign the frequency of the reflected signal, when a power of the reflected signal is the strongest, as the resonance frequency of the interior cavity of the housing.

5. The device according to claim 4, further comprising:
   a first power meter, electrically coupled with the power divider and operable to detect a power of the first incident signal; and
   a second power meter, electrically coupled with the directional coupler to receive the reflected signal and operable to detect the power of the reflected signal, to enable the control module to monitor the power of the reflected signal.

6. The device according to claim 1, wherein the control module is further configured to determine the pressure of the gas contained within the interior cavity of the housing based further on, at least partially, a comparison between the resonance frequency of the interior cavity of the housing at two different times.

7. The device according to claim 6, wherein the resonance frequency of the interior cavity of the housing at an earlier one of the two different times is predetermined.

8. The device according to claim 6, wherein:
the control module is further configured to detect a change in the pressure of the gas contained within the interior cavity of the housing based on a difference between the resonance frequency of the interior cavity of the housing at the two different times; and
the control module is further configured to determine the pressure of the gas contained within the interior cavity of the housing based further on, at least partially, the change in the pressure of the gas contained within the interior cavity of the housing.

9. The device according to claim 8, wherein the control module is further configured to detect a change in the pressure of the gas contained within the interior cavity of the housing by proportionally relating the difference between the resonance frequency of the interior cavity of the housing at the two different times and the change in the pressure of the gas contained within the interior cavity of the housing.

10. The device according to claim 1, wherein the gas comprises helium gas.

11. The device according to claim 1, further comprising:
a magnetic recording medium within the interior cavity of the housing;
an arm within the interior cavity of the housing and rotatably movable relative to the magnetic recording medium; and
a read-write head coupled to the arm.

12. An apparatus, comprising:
a signal module, configured to control generation of a reflected radio wave within an interior cavity of a hermetically sealed device;
a resonance frequency module, configured to determine a resonance frequency of the interior cavity of the hermetically sealed device based on, at least partially, the reflected radio wave; and
a pressure module, configured to determine a pressure of a gas contained within the interior cavity of the hermetically sealed device based on, at least partially, the resonance frequency of the interior cavity of the hermetically sealed device,
wherein each of the signal module, the resonance frequency module, and the pressure module comprises one or more of logic hardware or executable code, the executable code being stored on one or more non-transitory machine-readable storage media of the apparatus.

13. The apparatus according to claim 12, wherein:
the signal module is further configured to control generation of the reflected radio wave within the interior cavity of the hermetically sealed device at a plurality of frequencies; and
the resonance frequency module is further configured to determine the resonance frequency by assigning the frequency of the reflected radio wave, when a power of the reflected radio wave is the strongest, as the resonance frequency of the interior cavity of the hermetically sealed device.

14. The apparatus according to claim 12, wherein the pressure module is further configured to determine the pressure of the gas contained within the interior cavity of the hermetically sealed device based on, at least partially, a difference, over time, in the resonance frequency of the interior cavity of the hermetically sealed device determined by the resonance frequency module.

15. The apparatus according to claim 14, wherein:
the resonance frequency module is further configured to detect a change in the resonance frequency of the interior cavity of the hermetically sealed device;
the pressure module is further configured to detect a change in the pressure of the gas contained within the interior cavity of the hermetically sealed device based on, at least partially, the change in the resonance frequency of the interior cavity of the hermetically sealed device;
the pressure module is further configured to determine the pressure of the gas contained within the interior cavity of the hermetically sealed device based on, at least partially, the change in the pressure of the gas contained within the interior cavity of the hermetically sealed device; and
the change in the pressure of the gas contained within the interior cavity of the hermetically sealed device is proportional with the change in the resonance frequency of the interior cavity of the hermetically sealed device.

16. An apparatus, comprising:
a signal means for controlling generation of a reflected radio wave within an interior cavity of a hermetically sealed device;
a resonance frequency means for determining a resonance frequency of the interior cavity of the hermetically sealed device based on, at least partially, the reflected radio wave; and
a pressure means for determining a pressure of a gas contained within the interior cavity of the hermetically sealed device based on, at least partially, the resonance frequency of the interior cavity of the hermetically sealed device.

* * * * *